US010534280B2

(12) United States Patent
Cohen et al.

(10) Patent No.: US 10,534,280 B2
(45) Date of Patent: Jan. 14, 2020

(54) ELECTROSTATIC INK COMPOSITIONS

(71) Applicant: HP Indigo B.V., Amstelveen (NL)

(72) Inventors: Haim Cohen, Modiin (IL); Igor Shutyi, Nes Ziona (IL); Reut Avigdor, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/772,009

(22) PCT Filed: Dec. 18, 2015

(86) PCT No.: PCT/EP2015/080603
§ 371 (c)(1),
(2) Date: Apr. 27, 2018

(87) PCT Pub. No.: WO2017/102032
PCT Pub. Date: Jun. 22, 2017

(65) Prior Publication Data
US 2018/0314179 A1    Nov. 1, 2018

(51) Int. Cl.
*G03G 9/135* (2006.01)
*C09D 11/52* (2014.01)
*C09D 11/107* (2014.01)
*G03G 9/125* (2006.01)
*G03G 9/13* (2006.01)

(52) U.S. Cl.
CPC .......... *G03G 9/135* (2013.01); *C09D 11/107* (2013.01); *C09D 11/52* (2013.01); *G03G 9/125* (2013.01); *G03G 9/131* (2013.01); *G03G 9/132* (2013.01); *G03G 2215/0629* (2013.01)

(58) Field of Classification Search
CPC ..................................................... C09D 11/30
See application file for complete search history.

(56) References Cited

U.S. PATENT DOCUMENTS

| 3,389,100 | A | 6/1968 | Cook |
| 5,908,729 | A | 6/1999 | Landa et al. |
| 7,521,490 | B2 | 4/2009 | Schmalzl et al. |

(Continued)

FOREIGN PATENT DOCUMENTS

| EP | 0062482 | 10/1982 |
| WO | WO-01/84247 | 11/2001 |

(Continued)

OTHER PUBLICATIONS

Acumist B6 datasheet by Honeywell (Year: 2017).*
(Continued)

*Primary Examiner* — Scott R. Walshon
*Assistant Examiner* — Sathavaram I Reddy
(74) *Attorney, Agent, or Firm* — Dierker & Kavanaugh PC

(57) ABSTRACT

Herein is disclosed a liquid electrostatic ink composition. The composition may comprise a liquid carrier having dispersed therein: chargeable particles comprising a thermoplastic resin having acidic side groups; and globular particles comprising a hydrocarbon having a drop point, measured according to ASTM D3954-15, of at least 120° C., the globular particles having a D50 of from 2 μm to 7 μm and a D90 of 10 μm or less, the D50 and D90 being measured in the liquid carrier using laser diffraction and volume distribution, in accordance with ISO13220.

12 Claims, 6 Drawing Sheets

(56) References Cited

U.S. PATENT DOCUMENTS

| | | |
|---|---|---|
| 8,252,105 B2 | 8/2012 | Wicker et al. |
| 2003/0113445 A1* | 6/2003 | Martin ............... A61K 9/2893 427/180 |
| 2012/0282403 A1 | 11/2012 | Ray et al. |
| 2013/0202860 A1 | 8/2013 | Wei et al. |
| 2013/0215184 A1* | 8/2013 | Koenig ............... C08F 291/00 347/20 |
| 2013/0224649 A1* | 8/2013 | Bar-Haim ............... G03G 9/12 430/112 |
| 2014/0296392 A1 | 10/2014 | Bach et al. |

FOREIGN PATENT DOCUMENTS

| | | |
|---|---|---|
| WO | WO-2013/091667 | 6/2013 |
| WO | WO-2013/107498 | 7/2013 |
| WO | WO-2015/000529 | 1/2015 |

OTHER PUBLICATIONS

Polypropylene Wax datasheet by Deurex (Year: 2018).*
"Liquid Polyethylene Wax Polyethylene Wax Emulsion", Ram Charm Product Development Information, Oct. 2012, vol. 2 Issue 7, Ram Charan Company, Tamil Nadu, India.
International Search Report and Written Opinion for International Application No. PCT/EP2015/080603 dated Apr. 12, 2016, 10 pages.

* cited by examiner

ELECTROSTATIC INK COMPOSITIONS

BACKGROUND

Electrostatic printing processes may involve creating an image on a photoconductive surface, applying an ink having charged particles to the photoconductive surface, such that they selectively bind to the image, and then transferring the charged particles in the form of the image to a print substrate.

The photoconductive surface may be on a cylinder and is otherwise termed a photo imaging plate (PIP). The photoconductive surface is selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or by being first transferred to an intermediate transfer member, which can be a soft swelling blanket, and then to the print substrate.

DETAILED DESCRIPTION

Figure 1:
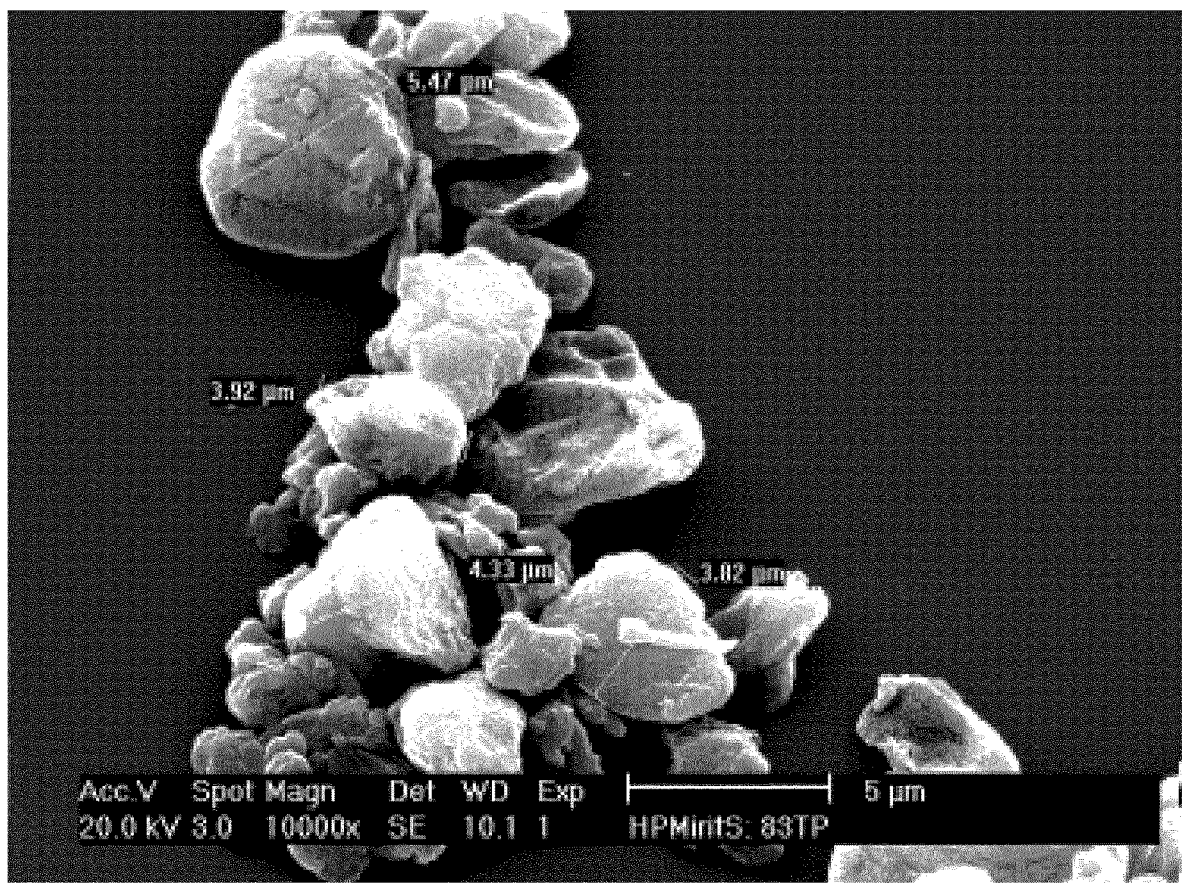
FIGS. 1 and 2 each shows a scanning electron micrograph of examples of hydrocarbon-containing globular particles that may be used to form an example of an electrostatic ink composition as described herein.

Before the electrostatic ink composition and related aspects are disclosed and described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid," "carrier," or "carrier vehicle" refers to the fluid in which the polymers, particles, colorant, charge directors and other additives can be dispersed to form a liquid electrostatic ink or electrophotographic ink. Such carrier liquids and vehicle components are known in the art. Typical carrier liquids can include a mixture of a variety of different agents, such as surfactants, co-solvents, viscosity modifiers, and/or other possible ingredients.

As used herein, "electrostatic ink composition" generally refers to an ink composition that is typically suitable for use in an electrostatic printing process, sometimes termed an electrophotographic printing process. The electrostatic ink composition may include chargeable particles of the resin and a pigment dispersed in a liquid carrier, which may be as described herein.

As used herein, "copolymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly, or indirectly via an intermediate transfer member, to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field gradient of 1000 V/cm or more, or in some examples 1500 V/cm or more.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect or any other feature described herein.

In some examples, there is provided a liquid electrostatic ink composition. The liquid electrostatic ink composition may comprise a liquid carrier having dispersed therein:
chargeable particles comprising a thermoplastic resin having acidic side groups and globular particles. The globular particles may comprise a hydrocarbon having a drop point, measured according to ASTM D3954-15, of at least 120° C. The globular particles may have a D50 of from 2 μm to 7 μm and/or a D90 of 10 μm or less, the D50 and D90 being measured in the liquid carrier using laser diffraction and volume distribution, in accordance with ISO13220.

In some examples, there is provided a method of forming an electrostatic ink composition. The method may comprise:
grinding a thermoplastic resin having acidic side groups in a liquid carrier to provide a slurry comprising particles comprising the thermoplastic resin dispersed in the liquid carrier;
adding globular particles to the slurry. The globular particles may comprise a hydrocarbon having a drop point, measured according to ASTM D3954-15, of at least 120° C. The globular particles may have a D50 of from 2 μm to 7 μm and a D90 of 10 μm or less, the D50 and D90, when measured in the liquid carrier using laser diffraction and volume distribution, in accordance with ISO13220.

In some examples, there is provided a substrate having printed thereon:
a layer formed from a thermoplastic resin having acidic side groups; wherein globular particles protrude above the surface of the thermoplastic resin. The globular particles may comprise a hydrocarbon having a drop point, measured according to ASTM D3954-15, of at least 120° C.

Globular Particles

Figure 2:
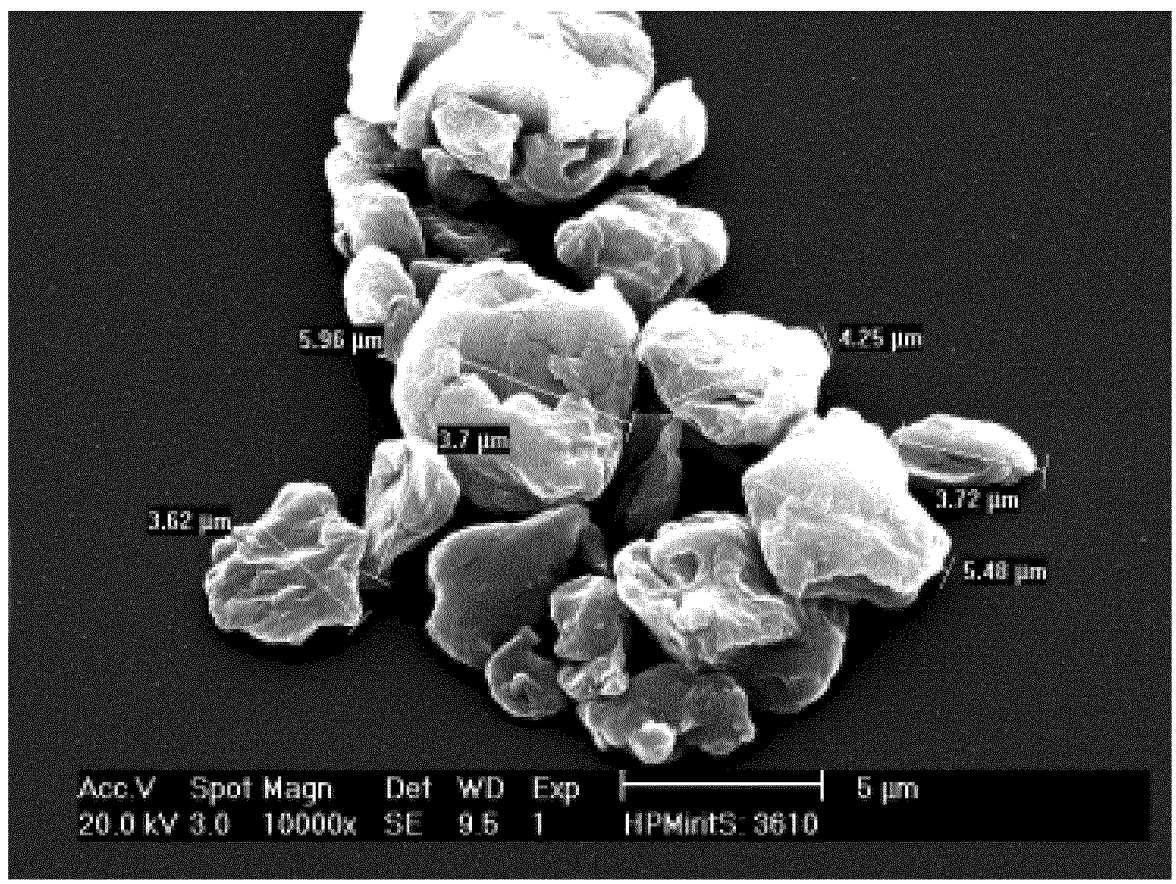

The globular particles may be described as having a generally globular shape. In some examples, a globular particle may be defined as a particle that is not rod-shaped or flat (e.g. flake-shaped). A globular particle may be roughly spherical and/or have a low aspect ratio. In some examples, at least some of the globular particles have an aspect ratio of 1.5 or less, in some examples 1.4 or less, in some examples 1.3 or less, in some examples 1.2 or less, in some examples 1.1 or less. "At least some of the globular particles" may be an amount of 50% by number, in some examples at least 80% by number, in some examples at least 90% by number, determined, for example, by analysing a sample of the globular particles in a scanning electron micrograph, the sample containing at least 50 globular particles, in some examples at least 100 particles. The aspect ratio of a particle may be measured using scanning electron micrograph analysis, and by determining, for a particle, the longest dimension and the shortest dimension and dividing the longest dimension by the shortest dimension. The longest dimension may be the maximum Feret diameter of a particle. The shortest dimension may be the minimum Feret diameter of a particle. A Feret diameter can be described as the distance between the two parallel planes restricting the object perpendicular to that direction. Illustrations of the Feret diameter of particles are shown in FIGS. 1 and 2.

The globular particles may have a D50 of from 2 μm to 7 μm, in some examples a D50 of from 3 μm to 6 μm, in some examples from 4 μm to 6 μm. The globular particles may have a D90 of 10 μm or less, in some examples a D90 of from 6 μm to 10 μm, in some examples from 7 μm to 9 μm, the D50 and D90, when measured in the liquid carrier using laser diffraction and volume distribution, in accordance with ISO13220. The D50 and D90 may be measured in the liquid carrier using laser diffraction and volume distribution, for example in accordance with ISO13220. The D50 and D90 of the globular particles may be measured in a volume of the liquid carrier before addition of the globular particles in the liquid carrier to the other components of the electrostatic ink composition. The D50 and D90 of the globular particles may be measured by taking a sample of a batch of the globular particles (e.g. the batch being in dry form) and dispersing this in a volume of the liquid carrier and then measuring the D50 and D90, with at least some of the rest of the batch of globular particles, e.g. in dry form, being added to the slurry.

The globular particles comprise a hydrocarbon. The hydrocarbon may be a polyalkylene, such as polypropylene or polyethylene. The hydrocarbon may be a homopolymer of ethylene or propylene. The hydrocarbon may be an unsubstituted hydrocarbon. An unsubstituted hydrocarbon may be defined as a hydrocarbon lacking functional groups, with a functional group being defined as a group having atoms other than hydrogen and carbon. An unsubstituted hydrocarbon may be defined as a hydrocarbon formed entirely of hydrogen and carbon atoms. In some examples, the hydrocarbon comprises, consists essentially or consists of polyethylene, which may be high density polyethylene. The high density polyethylene may have a density of at least 0.93 g/cm$^3$, in some example at least 0.94 g/cm$^3$, in some examples at least 0.95 g/cm$^3$, in some examples at least 0.95 g/cm$^3$, in some examples at least 0.96 g/cm$^3$, in some examples at least 0.97 g/cm$^3$. The high density polyethylene may have a density of from 0.93 g/cm$^3$ to 0.99 g/cm$^3$, in some examples a density of from 0.93 g/cm$^3$ to 0.98 g/cm$^3$, in some examples a density of from 0.93 g/cm3 to 0.98 g/cm$^3$, in some examples a density of from 0.93 g/cm3 to 0.97 g/cm$^3$, in some examples a density of from 0.94 g/cm3 to 0.97 g/cm$^3$, in some examples a density of from 0.95 g/cm3 to 0.97 g/cm$^3$.

in some example at least 0.94 g/cm$^3$, in some examples at least 0.95 g/cm$^3$, in some examples at least 0.95 g/cm$^3$, in some examples at least 0.96 g/cm$^3$, in some examples at least 0.97 g/cm$^3$.

In some examples, at least some, in some examples all, of the globular particles substantially consist of the hydrocarbon. In other words, they may be considered solid particles made substantially entirely of the hydrocarbon. Suitable globular particles include Ceridust 3610, available from Clariant.

In some examples, at least some of the globular particles comprise a non-hydrocarbon core having a shell comprising the hydrocarbon surrounding the core. In some examples, at least some of the globular particles comprise a carbohydrate core having a shell surrounding the core comprising the hydrocarbon. The carbohydrate may be selected from monosaccharides or polysaccharides. The monosaccharides may be selected from pentose and hexose sugars. The monosaccharide may be selected from ribose, arabinose, xylose, lyxose, allose, altrose, glucose, mannose and galactose. The polysaccharide may be a disaccharide, i.e. a carbohydrate comprising molecules of two saccharide units, or a polysaccharide, i.e. a carbohydrate comprising molecules of three or more saccharide units. The disaccharide may have two sacharide units, each of which is independently selected from ribose, arabinose, xylose, lyxose, allose, altrose, glucose, mannose and galactose The disaccharide may be selected from sucrose, lactulose, lactose, maltose, trehalose, cellobiose and chitobiose The polysaccharide may be selected from a saccharide having three or more saccharide units, each of which is independently selected from ribose, arabinose, xylose, lyxose, allose, altrose, glucose, mannose and galactose. Suitable globular particles include Ceridust 8330TP, available from Clariant.

In some examples, the hydrocarbon has a drop point of at least 120° C. The hydrocarbon has a drop point of at least 125° C. The drop point may be from 120° C. to 140° C., in some examples from 120° C. to 135° C., in some examples from 125° C. to 135° C., in some examples from 125° C. to 130° C., in some examples about 128° C. or 129° C. Drop point may be measured according to ASTM D3954-15.

The globular particles may be present in the electrostatic ink composition an amount of at least 1 wt % of the solids of the electrostatic ink composition, in some examples at least 2 wt % of the solids of the electrostatic ink composition, in some examples at least 3 wt % of the solids of the electrostatic ink composition, in some examples at least 4 wt % of the solids of the electrostatic ink composition, in some examples at least 5 wt % of the solids of the electrostatic ink composition.

The globular particles may be present in the electrostatic ink composition an amount of from 1 wt % to 15 wt % of the solids of the electrostatic ink composition, in some examples from 3 wt % to 15 wt % of the solids of the electrostatic ink composition, in some examples from 5 wt % to 15 wt % of the solids of the electrostatic ink composition, in some examples from 5 wt % to 12 wt % of the solids of the electrostatic ink, in some examples from 5 wt % to 10 wt % of the solids of the electrostatic ink composition composition.

In some examples, the liquid electrostatic ink composition lacks halogenated compounds, such as polytetrafluoroethylene.

Resin

The electrostatic ink composition in some examples includes a resin having acidic side groups, which may be a thermoplastic resin. A thermoplastic polymer is sometimes referred to as a thermoplastic resin.

The resin may include a polymer. In some examples, the polymer of the resin may be selected from ethylene acrylic acid copolymers; ethylene methacrylic acid copolymers; copolymers of ethylene (e.g. 80 wt % to 99.9 wt %), and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); acrylic resins (e.g. copolymer of acrylic or methacrylic acid and at least one alkyl ester of acrylic or methacrylic acid wherein alkyl is, in some examples, from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylic acid ionomers and combinations thereof. In some examples, the thermoplastic resin having acidic side groups is a copolymer of an alkylene monomer, such as ethylene, and a monomer selected from acrylic acid and methacrylic acid.

The resin having acidic side groups may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures in the art, for example using the procedure described in ASTM D1386.

The resin may comprise a polymer, in some examples a polymer having acidic side groups, that has a melt flow rate of less than about 60 g/10 minutes, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the resin particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes. The melt flow rate can be measured using standard procedures in the art, for example as described in ASTM D1238.

The acidic side groups may be in free acid form or may be in the form of an anion and associated with multiple counterions, which may be metal counterions, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, in some examples from 10 wt % to about 20 wt % of the copolymer.

The resin may comprise two different polymers having acidic side groups. The two polymers having acidic side groups may have different acidities, which may fall within the ranges mentioned above. The resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The resin may comprise two different polymers having acidic side groups: a first polymer that is a copolymer of ethylene (e.g. 92 to 85 wt %, in some examples about 89 wt %) and acrylic or methacrylic acid (e.g. 8 to 15 wt %, in some examples about 11 wt %) having a melt flow rate of 80 to 110 g/10 minutes and a second polymer that is a co-polymer of ethylene (e.g. about 80 to 92 wt %, in some examples about 85 wt %) and acrylic acid (e.g. about 18 to 12 wt %, in some examples about 15 wt %), having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

In any of the resins mentioned above, the ratio of the first polymer having acidic side groups to the second polymer having acidic side groups can be from about 10:1 to about 2:1. In another example, the ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the resin comprises a single type of resin polymer, the resin polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the copolymer, in some examples from 16 wt % to about 20 wt % of the copolymer in some examples from 17 wt % to 19 wt % of the copolymer.

The resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples 5 to 40% by weight, in some examples 5 to 20% by weight of the copolymer, in some examples 5 to 15% by weight of the copolymer. The second monomer may constitute 1 to 50% by weight of the co-polymer, in some examples 5 to 40% by weight of the co-polymer, in some examples 5 to 20% by weight of the co-polymer, in some examples 5 to 15% by weight of the copolymer. In an example, the first monomer constitutes 5 to 40% by weight of the co-polymer, the second monomer constitutes 5 to 40% by weight of the co-polymer, and with the third monomer constituting the remaining weight of the copolymer. In an example, the first monomer constitutes 5 to 15% by weight of the co-polymer, the second monomer constitutes 5 to 15% by weight of the co-polymer, with the third monomer constituting the remaining weight of the copolymer. In an example, the first monomer constitutes 8 to 12% by weight of the co-polymer, the second monomer constitutes 8 to 12% by weight of the co-polymer, with the third monomer constituting the remaining weight of the copolymer. In an example, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute 1% or more by weight of the total amount of the resin polymers in the resin, e.g. the total amount of the polymer or polymers having acidic side groups and polymer having ester side groups. The polymer having ester side groups may constitute 5% or more by weight of the total amount of the resin polymers in the resin, in some examples 8% or more by weight of the total amount of the resin polymers in the resin, in some examples 10% or more by weight of the total amount of the resin polymers in the resin, in some examples 15% or more by weight of the total amount of the resin polymers in the resin, in some examples 20% or more by weight of the total amount of the resin polymers in the resin, in some examples 25% or more by weight of the total amount of the resin polymers in the resin, in some examples 30% or more by weight of the total amount of the resin polymers in the resin, in some examples 35% or more by weight of the total amount of the resin polymers in the resin. The polymer having ester side groups may constitute from 5% to 50% by weight of the total amount of the resin polymers in the resin, in some examples 10% to 40% by weight of the total amount of the resin polymers in the resin, in some examples 15% to 30% by weight of the total amount of the polymers in the resin.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

In an example, the polymer or polymers of the resin can be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aaclyn 201, Aclyn 246, Aclyn 285, and Aclyn 295), and the Lotader family of toners (e.g. Lotader 2210, Lotader, 3430, and Lotader 8200 (sold by Arkema)).

In some examples, the resin constitutes from 5% to 90%, in some examples from 5% to 80%, by weight of the solids of the ink composition. In some examples, the resin constitutes from 10% to 60% by weight of the solids of the ink composition. In other examples, the resin constitutes from 60% to 90%, in some examples from 60% to 80%, by weight of the solids of the ink composition.

Charge Director and Charge Adjuvants

The electrostatic ink composition may comprise a charge director. A charge director can be added to an electrostatic ink composition to impart a charge of a desired polarity and/or maintain sufficient electrostatic charge on the resin particles of an electrostatic ink composition. The charge director may comprise ionic compounds, particularly metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates. The charge director can impart a negative charge or a positive charge on the resin-containing particles of an electrostatic ink composition.

In some examples, the charge director comprises a sulfosuccinate salt of the general formula MAn, wherein M is a metal, n is the valence of M, and A is an ion of the general formula (I):

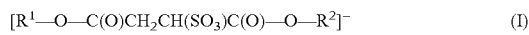
[R$^1$—O—C(O)CH$_2$CH(SO$_3$)C(O)—O—R$^2$]$^-$ (I)

wherein each of R$^1$ and R$^2$ is an alkyl group.

The sulfosuccinate salt of the general formula MAn is an example of a micelle forming salt. The charge director may be substantially free or free of an acid of the general formula HA, where A is as described above. The charge director may include micelles of said sulfosuccinate salt enclosing at least some of the nanoparticles. The charge director may include at least some nanoparticles having a size of 200 nm or less, and/or in some examples 2 nm or more.

In some examples, the charge director may comprise a simple salt. The simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, NH4, tert-butyl ammonium, Li+, and Al+3, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), Cl$^-$, $BF_4^-$, $ClO_4^-$, and $TiO_3^{4-}$, or from any sub-group thereof. The simple salt may be selected from CaCO$_3$, Ba$_2$TiO$_3$, Al$_2$(SO$_4$)$_3$, Al(NO$_3$)$_3$, Ca$_3$(PO$_4$)$_2$, BaSO$_4$, BaHPO$_4$, Ba$_2$(PO$_4$)$_3$, CaSO$_4$, (NH$_4$)$_2$CO$_3$, (NH$_4$)$_2$SO$_4$, NH$_4$OAc, Tert-butyl ammonium bromide, NH$_4$NO$_3$, LiTFA, Al$_2$(SO$_4$)$_3$, LiClO$_4$ and LiBF$_4$, or any sub-group thereof. The charge director may further include basic barium petronate (BBP).

In the formula [R$_1$—O—C(O)CH$_2$CH(SO$_3^-$)C(O)—O—R$_2$], in some examples each of R$_1$ and R$_2$ is an aliphatic alkyl group. In some examples, each of R$_1$ and R$_2$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, R$_1$ and R$_2$ are the same. In some examples, at least one of R$_1$ and R$_2$ is C$_{13}$H$_{27}$. In some examples, M is Na, K, Cs, Ca, or Ba.

In some examples, the charge director may comprise one of, some of, or all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20%, in some examples 0.01% to 20% by weight, in some examples 0.01 to 10% by weight, in some examples 0.01% to 1% by weight of the solids of an electrostatic ink composition. In some examples, the charge director constitutes about 0.001% to 0.15% by weight of the solids of the electrostatic ink composition, in some examples 0.001% to 0.15%, in some examples 0.001% to 0.02% by weight of the solids of an electrostatic ink composition, in some examples 0.1% to 2% by weight of the solids of the electrostatic ink composition, in some examples 0.2% to 1.5% by weight of the solids of the electrostatic ink composition in some examples 0.1% to 1% by weight of the solids of the electrostatic ink composition, in some examples 0.2% to 0.8% by weight of the solids of the electrostatic ink composition. In some examples, the charge director is present in an amount of at least 1 mg of charge director per gram of solids of the electrostatic ink composition (which will be abbreviated to mg/g herein), in some examples at least 2 mg/g, in some examples at least 3 mg/g, in some examples at least 4 mg/g, in some examples at least 5 mg/g, in some examples at least 20 mg/g, in some examples at least 40 mg/g, in some examples at least 50 mg/g, in some examples at least 60 mg/g. In some examples, the charge director is present in an amount of from 1 mg/g to 100 mg/g, in some examples from 20 mg/g to 100 mg/g, in some examples from 40 mg/g to 100 mg/g, in some examples from 60 mg/g to 100 mg/g, in some examples from 70 mg/g to 90 mg/g, in some examples about 80 mg/g. In some examples, the charge director is present in an amount of from 1 mg/g to 25 mg/g, in some examples from 1 mg/g to 20 mg/g, in some examples from 1 mg/g to 15 mg/g, in some examples from 1 mg/g to 10 mg/g, in some examples from 3 mg/g to 20 mg/g, in some examples from 3 mg/g to 15 mg/g, in some examples from 5 mg/g to 10 mg/g.

The electrostatic ink composition may further include a charge adjuvant. A charge adjuvant may promote charging of the resin-containing particles when a charge director is present. The method as described here may involve adding a charge adjuvant at any stage. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. The charge adjuvant may be present in an amount of about 0.1 to 5% by weight, in some examples about 0.1 to 1% by weight, in some examples about 0.3 to 0.8% by weight of the solids of the electrostatic ink composition, in some examples about 1 wt % to 3 wt % of the solids of the electrostatic ink composition, in some examples about 1.5 wt % to 2.5 wt % of the solids of the electrostatic ink composition.

In some examples, the electrostatic ink composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a C$_8$ to C$_{26}$ fatty acid anion, in some examples a C$_{14}$ to C$_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition, in some examples about 1 wt % to 3 wt % of the solids of the electrostatic ink composition, in some examples about 1.5 wt % to 2.5 wt % of the solids of the electrostatic ink composition. In some examples, the electrostatic ink composition may lack or substantially lack a salt of multivalent cation and a fatty acid anion, e.g. 1 wt % or less of the solids of the electrostatic ink composition may be a salt of multivalent cation and a fatty acid anion, in some examples 0.5 wt % or less, in some examples 0.1 wt % or less, in some examples 0.05 wt % or less.

Liquid Carrier

In some examples, the electrostatic ink composition comprises a liquid carrier. Generally, the liquid carrier can act as a dispersing medium for the other components in the electrostatic ink composition. For example, the liquid carrier can comprise or be a hydrocarbon, silicone oil, vegetable oil, etc. The liquid carrier can include, but is not limited to, an insulating, non-polar, non-aqueous liquid that can be used as a medium for toner particles. The liquid carrier can include compounds that have a resistivity in excess of about $10^9$ ohm-cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™ Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N16™, Teclen N20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF4™, AF5™, AF6™ and AF7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before printing, the liquid carrier can constitute about 20% to 99.5% by weight of the electrostatic ink composition, in some examples 50% to 99.5% by weight of the electrostatic ink composition. Before printing, the liquid carrier may constitute about 40 to 90% by weight of the electrostatic ink composition. Before printing, the liquid carrier may constitute about 60% to 80% by weight of the electrostatic ink composition. Before printing, the liquid carrier may constitute about 90% to 99.5% by weight of the electrostatic ink composition, in some examples 95% to 99% by weight of the electrostatic ink composition.

The ink, when printed on the print substrate, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the print substrate contains less than 5 wt % liquid carrier, in some examples, less than 2 wt % liquid carrier, in some examples less than 1 wt % liquid carrier, in some examples less than 0.5 wt % liquid carrier. In some examples, the ink printed on the print substrate is free from liquid carrier.

Colorant

The particles comprising the thermoplastic resin of the electrostatic ink composition or the layer of thermoplastic resin on the print substrate resin may further comprise a colorant. The colorant may be selected from a pigment, dye and a combination thereof. The colorant may be transparent, unicolor or composed of any combination of available colors. The colorant may be selected from a cyan colorant, a yellow colorant, a magenta colorant and a black colorant. In an embodiment, the particles comprise a plurality of colorants. In an embodiment, the particles comprise a first colorant and second colorant, which are different from one another. Further colorants may also be present with the first and second colorants. In an embodiment, first and second colorants are each independently selected from a cyan colorant, a yellow colorant, a magenta colorant and a black colorant. In an embodiment, the first colorant comprises a black colorant, and the second colorant comprises a non-black colorant, for example a colorant selected from a cyan colorant, a yellow colorant and a magenta colorant. The colorant may be selected from a phthalocyanine colorant, an indigold colorant, an indanthrone colorant, a monoazo colorant, a diazo colorant, inorganic salts and complexes, dioxazine colorant, perylene colorant, anthraquinone colorants, and any combination thereof.

The colorant may comprise a yellow colorant. For example, the yellow colorant may be selected from Yellow Pigment 1, Yellow Pigment 3, Yellow Pigment 12, Yellow Pigment 13, Yellow Pigment 14, Yellow Pigment 17, Yellow Pigment 62, Yellow Pigment 65, Yellow Pigment 74, Yellow Pigment 81, Yellow Pigment 83, Yellow Pigment 97, Yellow Pigment 138, Yellow Pigment 139, Yellow Pigment 150, Yellow Pigment 151, Yellow Pigment 154, Yellow Pigment 168, Yellow Pigment 174, Yellow Pigment 176, Yellow Pigment 180, Yellow Pigment 183, Yellow Pigment 188, 5 Yellow Pigment 191, and any combination thereof.

The colorant may comprise a magenta colorant. For example, the magenta colorant may be selected from Pigment Red 2, Pigment Red 3, Pigment Red 5, Pigment Red 8, Pigment Red 12, Pigment Red 21, Pigment Red 22, Pigment Red 23, Pigment Red 31, Pigment Red 38, Pigment Red 48:1, Pigment Red 48:2, Pigment Red 48:3, Pigment Red 48:45 Pigment Red 49:1, Pigment Red 49:2, Pigment Red 53:1, Pigment Red 57:1, Pigment Red 81, Pigment Red 112, Pigment Red 122, Pigment Red 123, Pigment Red 144, Pigment Red 146, Pigment Red 149, Pigment Red 170, Pigment Red 175, Pigment Red 176, Pigment Red 177, Pigment Red 179, Pigment Red 185, Pigment Red 190, Pigment Red 202, Pigment Red 208, Pigment Red 224, Pigment Red 254, Pigment Violet 19, Pigment Violet 23, and any combination thereof.

The colorant may comprise a cyan colorant. For example, the cyan colorant may be selected from Pigment Blue 15:0, Pigment Blue 15:1, Pigment Blue 15:2, Pigment Blue 15:3, Pigment Blue 15:4, Pigment Blue 17, Pigment Blue 17:1, Pigment Blue 27, Pigment Blue 60, Pigment Blue 63, Pigment Blue 66 Pigment Blue 73 Pigment Blue 75, Pigment Blue 79 and any combination thereof.

In an embodiment, the colorant may comprise a black colorant, for example a black organic colorant or a black inorganic colorant. For example, the black organic colorant may comprise Pigment Black 7. The black colorant may comprise or be carbon black. Carbon black is known in the art. The black colorant may comprise or be an inorganic material, for example an oxide of a metal. The black colorant may be an oxide of a metal selected from ruthenium, manganese, nickel, chromium, iron, cobalt, copper, and alloys thereof; and mixtures thereof. The black colorant may be selected from $Fe_3O_4$, $RuO_2$, $Cr_3O_4$, $Co_2O_3$, Ni, Fe—Co chromite, Cr—Fe—Ni spinel, and Cu-chromite. In an embodiment, the chargeable particles comprise a first colorant comprising carbon black, and a second colorant comprising a non-black colorant, for example a colorant selected from a cyan colorant, a yellow colorant and a magenta colorant.

Other Additives

The electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket. The incompatible wax may have particle size distribution (e.g. D50) lower than the globular particles described herein, e.g. a D50 of 3 µm or less, in some examples 2 µm or less, with D50 being determined in the liquid carrier and after any grinding of the incompatible wax particles has been carried out.

Method

In some examples, there is provided a method of forming an electrostatic ink composition. The method may comprise:
grinding a thermoplastic resin having acidic side groups in a liquid carrier to provide a slurry comprising particles comprising the thermoplastic resin dispersed in the liquid carrier;
adding globular particles to the slurry. The globular particles may comprise a hydrocarbon having a drop point, measured according to ASTM D3954-15, of at least 120° C. The globular particles may have a D50 of from 2 µm to 7 µm and a D90 of 10 µm or less, the D50 and D90, when measured in the liquid carrier using laser diffraction and volume distribution, in accordance with ISO13220. The D50 and D90 of the globular particles may be measured in a volume of the liquid carrier before addition of the globular particles in the liquid carrier to the other components of the electrostatic ink composition. The D50 and D90 of the globular particles may be measured by taking a sample of a batch of the globular particles (e.g. the batch being in dry form) and dispersing this in a volume of the liquid carrier and then measuring the D50 and D90, with at least some of the rest of the batch of globular particles, e.g. in dry form, being added to the slurry.

In some examples, the globular particles are mixed in the slurry without reducing the particle size of the globular particles. In some examples, the globular particles are mixed in the slurry by stirring or shaking the slurry.

In some examples, the above method comprises grinding the thermoplastic resin having acidic side groups in a liquid carrier, wherein a colorant, e.g. a pigment, and/or a charge adjuvant as described herein are present in the liquid carrier during the grinding, and, in some examples, a charge director is combined with the thermoplastic resin, during or after the grinding to form the slurry and/or before or after the addition of the globular particles.

In some examples, the liquid carrier is present during the grinding of resin; and in some examples, the liquid carrier constitutes 10 to 99% by weight of the composition being ground in the mill, in some examples 30 to 99% by weight of the composition being ground in the mill, in some examples 50 to 95% by weight of the composition being ground in the mill, in some examples 70 to 90% by weight of the composition being ground in the mill. The grinding to form the slurry may be in a mill and may be carried out by rotating the mixture such that the RPM of the rotations is at least 100 RPM, in some examples at least 200 RPM, in some examples at least 250 RPM; and in some examples the grinding may be carried out for a period of at least 1 hour, in some examples 2 hours, in some examples 3 hours, in some examples 4 hours. The temperature during grinding may be at least 20° C., in some examples at least 25° C., in some examples at least 30° C., in some examples at least 40° C. A suitable grinding mill is a ball mill or attritor. A commercially available attritor is available from Union Process, such as a Union S1-attritor.

Printed Substrate

In some examples, there is provided a substrate, which may also be termed a print substrate, having printed thereon:
a layer formed from a thermoplastic resin having acidic side groups; wherein globular particles protrude above the surface of the thermoplastic resin. The globular particles may comprise a hydrocarbon having a drop point, measured according to ASTM D3954-15, of at least 120° C. The layer on the substrate comprising the thermoplastic resin and the globular particles may have been formed by printing an electrostatic ink composition as described herein in an electrophotographic printing process on the substrate. "The surface of the thermoplastic resin" may be defined as the surface of the thermoplastic resin that is generally parallel to the surface of the substrate on which the layer of thermoplastic resin is formed. At least some of the globular particles may protrude above the surface of the thermoplastic resin by at least 1 µm, in some examples at least 2 µm, in some examples at least 3 µm, in some examples at least 4 µm, in some examples at least 5 µm. At least some of the globular particles may protrude above the surface of the thermoplastic resin by from 1 µm to 10 µm, in some examples 2 µm to 8 µm, in some examples 2 µm to 6 µm, in some examples 2 µm to 5 µm. The portion of the globular particle protruding above the surrounding surface of the thermoplastic resin may have a coating of thermoplastic resin thereon. The layer formed by the thermoplastic resin, in areas between the globular particles, may have a thickness of from 0.5 μm to 2 μm. "At least some of the globular particles" may be an amount of 50% by number, in some examples at least 80% by number, in some examples at least 90% by number, determined, for example, by analysing a sample of the globular particles in a scanning electron micrograph, the sample containing at least 50 globular particles, in some examples at least 100 particles.

In some examples, at least some of the globular particles have a diameter on the printed substrate of from 2 μm to 10 μm, in some examples a diameter of from 2 μm to 8 μm (and including any coating of thermoplastic resin thereon). "At least some of the globular particles" may be an amount of 50% by number, in some examples at least 80% by number, in some examples at least 90% by number, determined, for example, by analysing a sample of the globular particles in a scanning electron micrograph, the sample containing at least 50 globular particles, in some examples at least 100 particles.

The print substrate may be any suitable substrate. The print substrate may be any suitable substrate capable of having an image printed thereon. The print substrate may include a material selected from an organic or inorganic material. The material may include a natural polymeric material, e.g. cellulose. The material may include a synthetic polymeric material, e.g. a material selected from polyethylene terephthalate, a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the print substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The print substrate is, in some examples, a cellulosic print substrate such as paper. The cellulosic print substrate is, in some examples, a coated cellulosic print substrate. In some examples, a primer may be coated onto the print substrate, before the electrostatic ink composition is printed onto the print substrate.

Also provided is a method of electrophotographic printing an electrostatic ink composition as described herein, the method comprising:
forming a latent electrostatic image on a surface;
contacting the surface with the electrostatic ink composition, such that at least some of the particles comprising the resin having acidic side groups and at least some of the globular particles adhere to the surface to form a developed toner image on the surface, and transferring the toner image to a print medium, in some examples via an intermediate transfer member.

The surface on which the latent electrostatic image is formed may be on a rotating member, e.g. in the form of a cylinder. The surface on which the latent electrostatic image is formed may form part of a photo imaging plate (PIP). The contacting may involve passing the electrostatic composition between a stationary electrode and a rotating member, which may be a member having the surface having a latent electrostatic image thereon or a member in contact with the surface having a latent electrostatic image thereon. A voltage is applied between the stationary electrode and the rotating member, such that the particles adhere to the surface of the rotating member. This may involve subjecting the electrostatic ink composition to an electric field having a field gradient of 50-400V/μm, or more, in some examples 600-900V/μm, or more.

The intermediate transfer member may be a rotating flexible member, which is in some examples heated, e.g. to a temperature of from 80 to 160° C., in some examples from 90 to 130° C., in some examples from 100 to 110° C.

The method of electrophotographic printing may be carried out so that a plurality of impressions or copies are carried out. The number of impressions or copies may be at least 10, in some examples at least 100, in some examples at least 1000, in some examples at least 2000, in some examples at least 3000, in some examples at least 5000. The print coverage on each print substrate in each impression may be 40% or less, in some examples 30% or less, in some examples 20% or less. An impression may be a single image of one colour formed on a print substrate. A copy may be a single image having a plurality of colours, e.g. selected from black, magenta, cyan and yellow.

The method of electrophotographic printing may be carried out so that a plurality of print substrate sheets are printed, for example 250 or more print substrate sheets, in some examples 500 or more print substrate sheets, in some examples 750 or more print substrate sheets, in some examples 1000 or more print substrate sheets. The sheets may be any suitable size or shape, e.g. of standard printing size, such as A4 or A3.

EXAMPLES

The following illustrates examples of the electrostatic ink compositions and other aspects described herein. Thus, these Examples should not be considered as limitations of the present disclosure, but are merely in place to teach how to make examples of the present disclosure.

Example 1—Production of an Electrostatic Ink Composition

"First, a "paste" of molten resins and Isopar was prepared on a laboratory scale "Ross" mixer using a procedure which involved mixing raw material resins and Isopar L fluid (available from ExxonMobil). The procedure began with raising the temperature of a mixture of 40 wt % of resin and 60 wt % Isopar L to 130° C. (266° F.) in the mixer at a mixing speed of 50 Hz. The resins used were Nucrel 699, available from DuPont, and A-C 5120, available from Honeywell, in the weight ratio of 4:1. After an hour and a half the mixer speed was raised to 70 Hz and the mixture then mixed at this speed for another hour. The next stage involved stopping the heating and reducing the mixer speed back to 50 Hz. This allowed the paste to cool to room temperature. After that, the paste was ground with pigment, Isopar and other additives: VCA and DS72. The grinding speed was 250 RPM and the grinding involved one stage of 12 hours at 45° C. The ink is ready after grinding, and then HPB a slurry (powder ground with Isopar and VCA at 21 wt % NVS) and DS72 added to working dispersion (3 wt % NVS) and solids (10 wt % NVS). The polyolefin wax particles Ceridust 3610 or Ceridust 8330TP at quantity of 5%-10% solids (w/w) inserted at this stage also (after grinding) with no previous treatment (pure powder as supplied from manufacturer). Simple shaker used for mechanically distribution of particles inside ink. Different equipment may be used for carrying out the procedure on different scales. For example, for the last step of incorporating the Ceridust particles, a large scale mixer may be used (e.g. a mixer available from Hobart).

Ceridust 3610 (available from Clariant; otherwise termed "YC-10" herein) are polyethylene particles that:
contain HDPE wax.
have a drop point of 130° C.
have a density of 0.97 gr/cm3.

The material's particle size is well distributed at 0.5-9 microns and D(50) of 4.5-5.5 microns (measured by Malvern Mastersizer). D90 was approximately 9 microns (as measured on Malvern Mastersizer).

Ceridust 8330TP (available from Clariant; otherwise termed "MC-30" herein) are polyethylene particles that:
contain HDPE wax as an outer shell.
contain a carbohydrate (namely sucrose) as a core, an amorphous substance with properties of toughness and flexible or rubbery-like. The carbohydrate is able to keep its shape even at high temperatures (above 150° C.).

The material's particle size is well distributed at 0.5-9 microns and D(50) of 4-5.5 microns (measure by Malvern Mastersizer). D90 was approximately 8 microns (as measured on Malvern Mastersizer).

In these Examples, VCA indicates an aluminium tristearate and palmitate salt, available from Sigma-Aldrich. HPB indicates an homopolymer polyethylene wax, available under the trade name Acumist B6 from Honeywell company; this is ground during the process such that D50 is about 0.17 μm and D90 1.62 μm (as measured by Malvern Mastersizer). DS72 is a silica powder, available under the trade name Aerosil R 7200 from Degussa-Evonik.

NCD is used for ink charging of the working dispersion; NCD indicates a charge director that, before addition to the ink, can include soya lecithin at 6.6% w/w, basic barium petronate BBP at 9.8% w/w, isopropyl amine dodecylebezene sulfonic acid at 3.6% w/w and about 80% w/w isoparaffin (Isopar®-L from Exxon)."

FIG. 1 shows a scanning electron micrograph of Ceridust 8330TP hydrocarbon-containing globular particles before inclusion in the ink. Various sizes of the particles can be seen on the micrograph.

FIG. 2 shows a scanning electron micrograph of Ceridust 3610 hydrocarbon-containing globular particles before inclusion in the ink. Various sizes of the particles can be seen on the micrograph.

Figure 3:
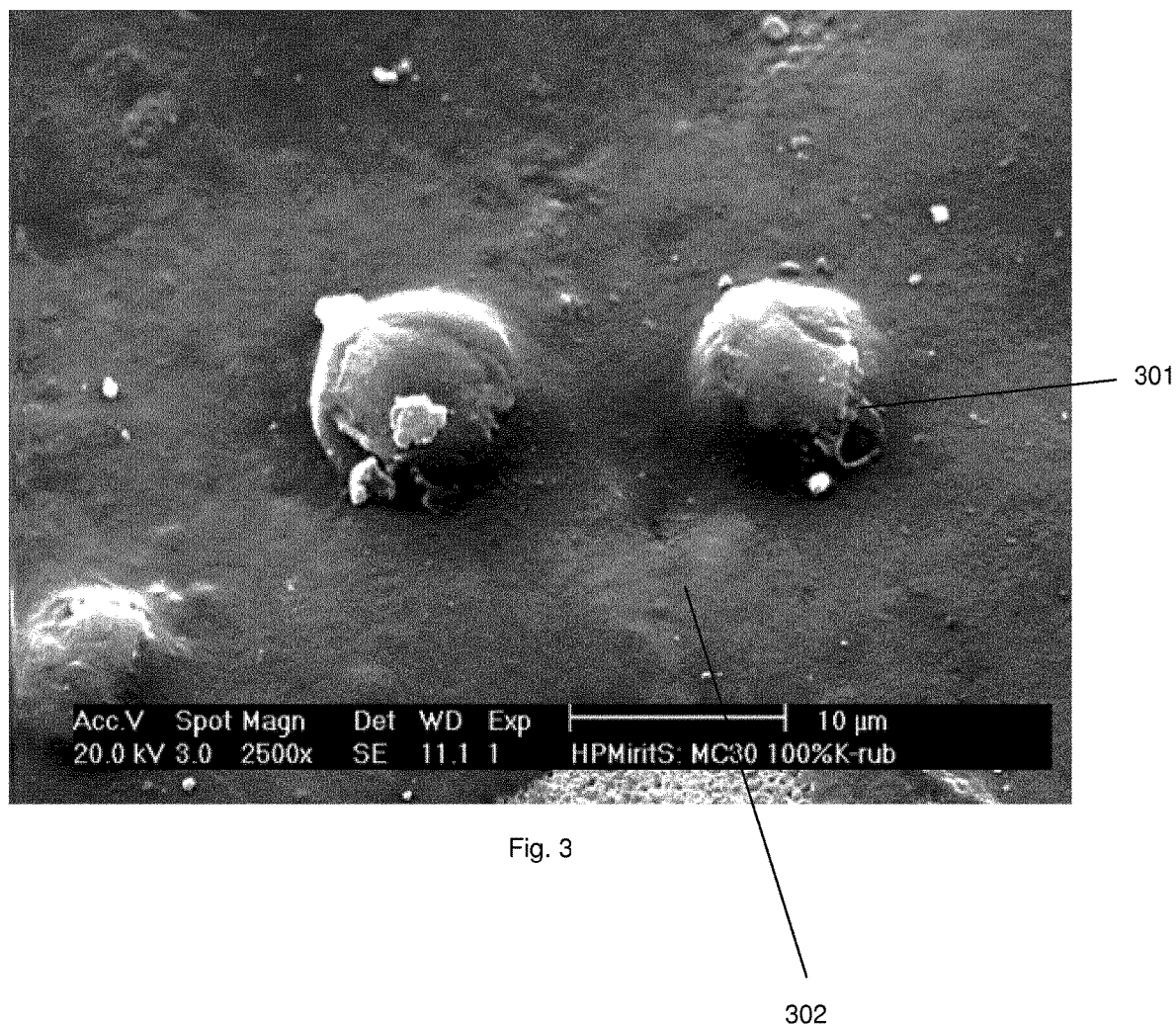
FIG. 3 shows a scanning electron micrograph of the surface of an example of an electrostatic ink as described herein when printed on a substrate, with the hydrocarbon particles protruding above the flat surface of the thermoplastic resin.

FIG. 3 shows a scanning electron micrograph of the surface of an electrostatic ink produced in accordance with Example 1, in this case with black ink pigment, when printed on a substrate, with the hydrocarbon particles (301) protruding above the flat surface of the thermoplastic resin (302).

Example 2—Rub Resistance Test Results—Black Inks

Inks were made in accordance with Example 1 containing black pigment. A suitable black pigment is, for example, a mixture of pigments comprising a primary pigment (e.g. Monarch 800 provided by Cabot, pigment Black 7) and a secondary pigment (e.g. Alkali blue D6200 by Flint Group, pigment blue 61).

To carry out the rub resistance test, an image rub case or rubbing instrument is used (a SUTHERLAND® rub tester). First a micronized silica (9 μm) rubbing film (an aluminium oxide lapping film, with 9 μm aluminium oxide particles, available from 3M) is placed on the top of the tested image (at 100% coverage) and rubbed for a predetermined number of strokes (in this case 100) which caused the image to be rubbed by the silica film. In order to quantify the damage visual and absolute image tenability to rub exist. The absolute analysis evolves X-rite spectrophotometer that sums the area quantity (%) that was actually removed.

Figure 4:
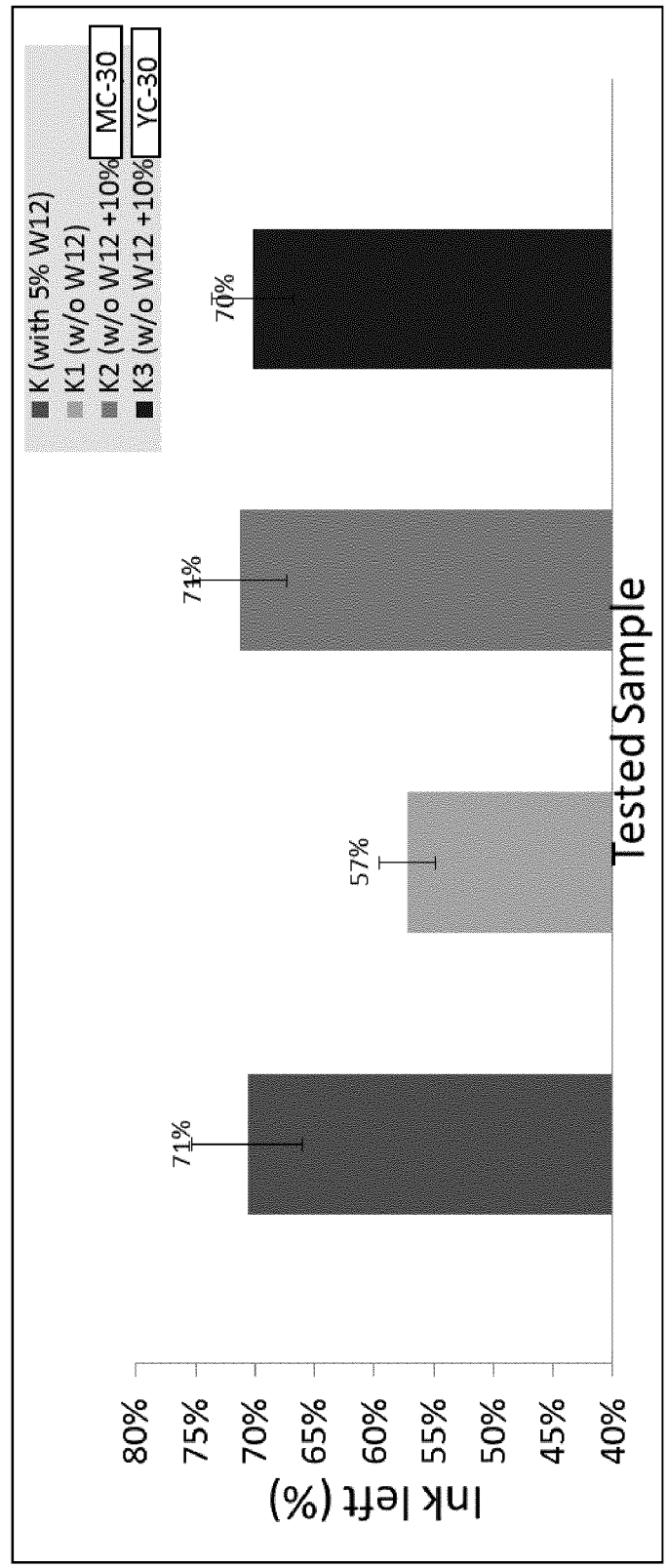
FIG. 4 shows rub tests results for various types of black ink, as described in the Examples below.

In this test a reference example with PTFE (polytetrafluoroethylene) particles (5 wt % solids), which is otherwise the same as Example 1 above, except Ceridust 3610 or Ceridust 8330TP having been replaced by the PTFE particles, had a value of 71% Ink left in the rub test. The PTFE particles were Zonyl MP1200, available from DuPont. A control example, which was otherwise the same as Example 1 above, except lacking Ceridust 3610, Ceridust 8330TP and PTFE particles, had a value of 57% Ink left in the rub test. Two inks made in accordance with Example 1, containing, respectively, 10 wt % Ceridust 8330TP and containing 10 wt % Ceridust 3610, had values of 71% and 70%. This is illustrated visually in FIG. 4. In this Figure, 'W12' indicates the PTFE particles, MC-30 indicates Ceridust 8330TP particles and YC-30 indicates Ceridust 3610 particles.

A flaking book test was carried out. Visual inspection of the samples prepared (the reference Examples, the control Example and samples containing Ceridust 8330TP and K3 containing Ceridust 3610), indicated that addition of Ceridust 8330TP or Ceridust 3610 improved the resistance to flaking compared to the control and was comparable to the reference sample.

Example 3—Rub Resistance Tests—Cyan Inks

Inks were made in accordance with Example 1 containing cyan pigment. A suitable cyan pigment is, for example, a mixture of a phthalocyainin pigment blue 15:3, available from TOYO company, a phthalocyanin pigment green 7, available from BASF.

Figure 5:
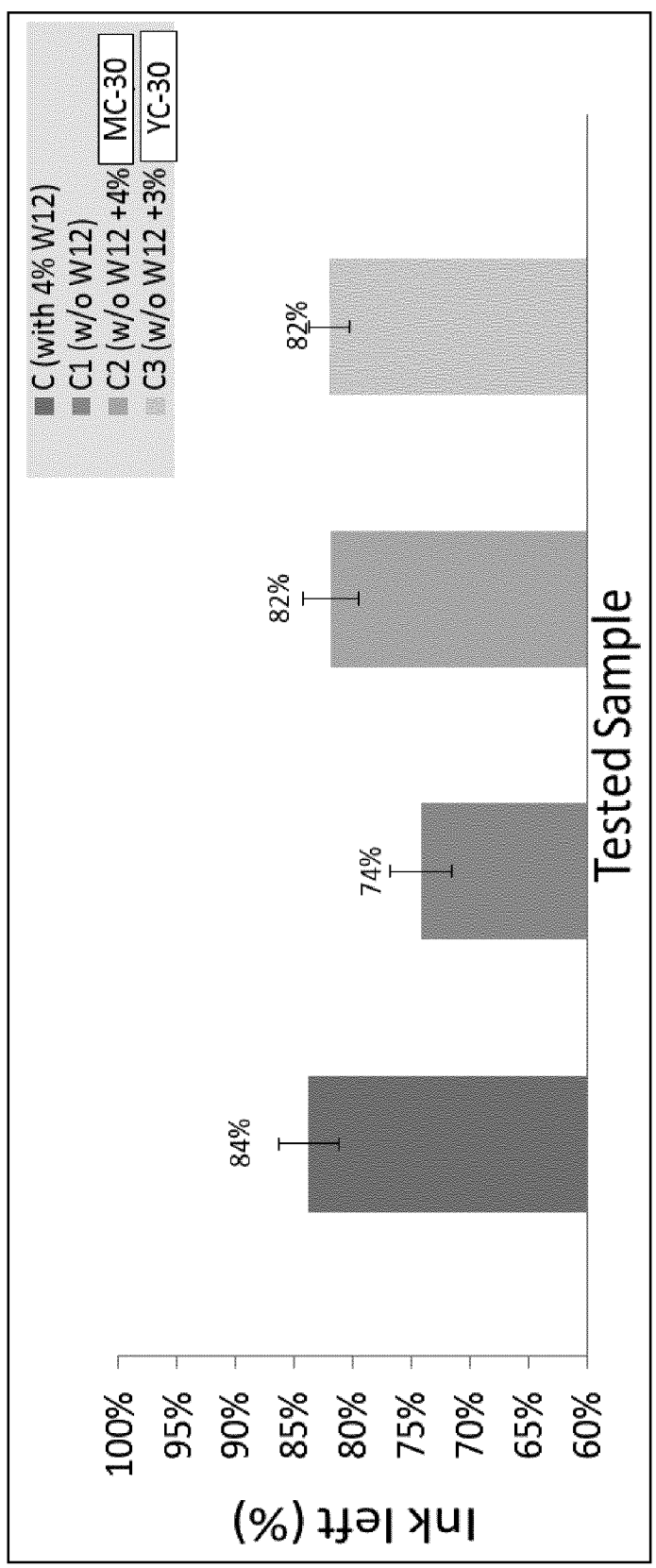
FIG. 5 shows rub tests results for various types of cyan ink, as described in the Examples below.

In this test a reference example with PTFE particles (4 wt % solids), which is otherwise the same as Example 1 above, except Ceridust 3610 or Ceridust 8330TP having been replaced by the PTFE particles, had a value of 84% Ink left in the rub test. A control example, which was otherwise the same as Example 1 above, except lacking Ceridust 3610, Ceridust 8330TP and PTFE particles, had a value of 74% Ink left in the rub test. Two inks made in accordance with Example 1, containing, respectively, 4 wt % Ceridust 8330TP and containing 3 wt % Ceridust 3610, both had values of 82%. This is illustrated visually in FIG. 5. In this Figure, 'W12' indicates the PTFE particles, MC-30 indicates Ceridust 8330TP particles and YC-30 indicates Ceridust 3610 particles. A flaking book test was carried out. Visual inspection of the samples prepared (the reference Examples, the control Example and samples containing Ceridust 8330TP and containing Ceridust 3610), indicated that addition of Ceridust 8330TP or Ceridust 3610 improved the resistance to flaking compared to the control and was comparable to the reference sample.

Example 4—Rub Resistance Tests—Magenta Inks

Inks were made in accordance with Example 1 containing magenta pigment. A suitable magenta pigment, for example, may be a mixture of pigment red 146, pigment red 185 and pigment red 122.

Figure 6:
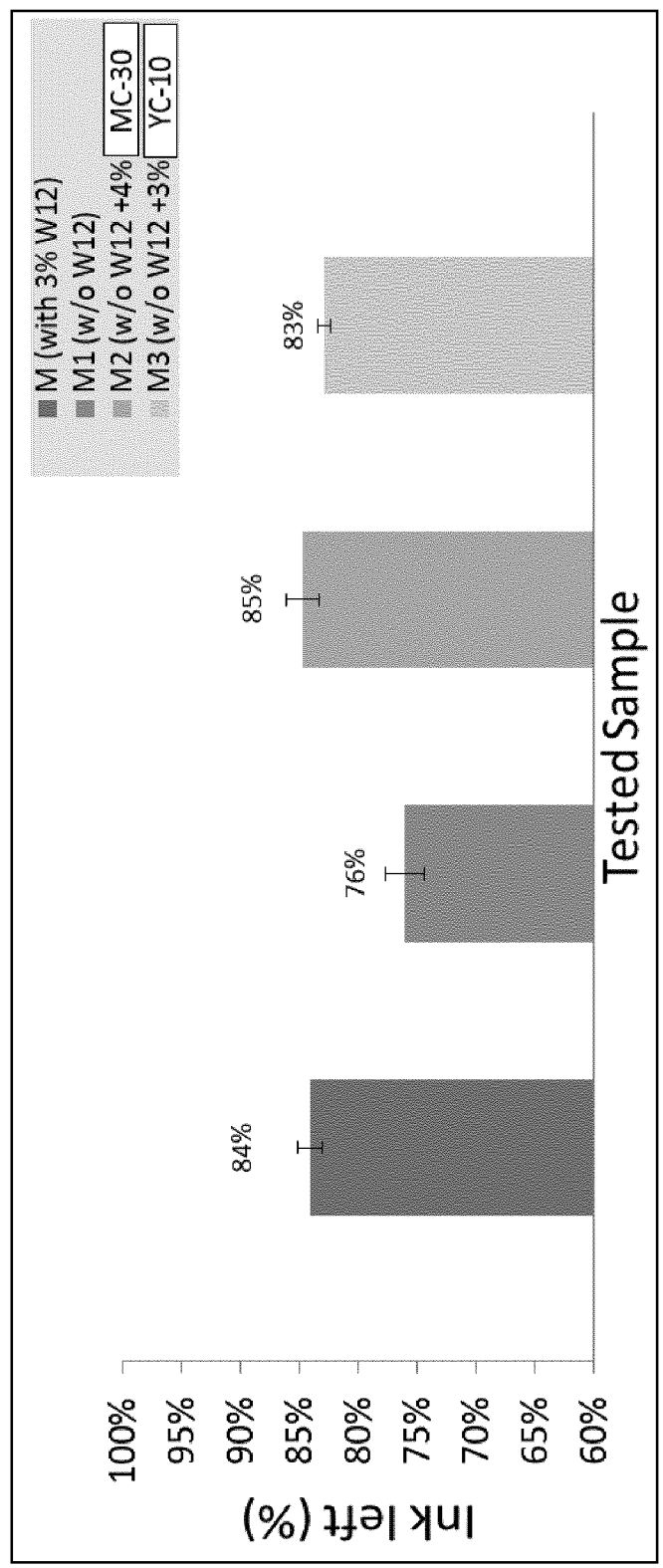
FIG. 6 shows rub test results for various types of magenta ink, as described in the Examples below.

In this test a reference example with PTFE particles (3 wt % solids, denoted 'W12'), which is otherwise the same as Example 1 above, except Ceridust 3610 or Ceridust 8330TP having been replaced by the PTFE particles, had a value of 84% Ink left in the rub test. A control example, which was otherwise the same as Example 1 above, except lacking Ceridust 3610, Ceridust 8330TP and PTFE particles, had a value of 76% Ink left in the rub test. Two inks made in accordance with Example 1, containing, respectively, 4 wt % Ceridust 8330TP and containing 3 wt % Ceridust 3610, had values of 85% and 83%. This is illustrated visually in FIG. 6. In this Figure, 'W12' indicates the PTFE particles, MC-30 indicates Ceridust 8330TP particles and YC-30 indicates Ceridust 3610 particles.

A flaking book test was carried out. Visual inspection of the samples prepared (the reference Examples, the control Example and samples containing Ceridust 8330TP and K3 containing Ceridust 3610), indicated that addition of Ceridust 8330TP or Ceridust 3610 improved the resistance to flaking compared to the control and was comparable to the reference sample.

Example 5

Tests were carried out on a large variety of particles, with the aim being to test their effectiveness (i) in their compatibility with Isopar, i.e. whether they could form a stable suspension, (ii) whether they are miscible with the resin having acidic side groups (the lower miscibility, the better, such that the particles maintain their integrity in the resin), (iii) whether they were transferred to the print substrate during electrostatic printing and (iv) whether they showed reasonable rub resistance. If the particles did not show reasonable offline results (e.g. in tests (i) and (ii)), they were not generally tested any further in the print tests. If they reasonable offline results, they were then tests for points (iii) and (iv). Results are given below in Table 1.

TABLE 1

| | | | | Particle size (μ) | | |
| --- | --- | --- | --- | --- | --- | --- |
| Material name | Supplier | Chemistry | mp (c. °) | D50 (μm) (Median) | D90 (μm) (tail) | Comment |
| Zonyl MP1200 | Dupont | PTFE micropowder | 325 | 3 | ≤9 | Reference Example (reasonable rub test results - see Examples above) |
| Ceridust 8330 TP | Clariant | Polyethylene wax with sucrose core | N/A | 4.2-5.5 | 8.0 | Example according to disclosure (reasonable rub test results - see Examples above) |
| Ceridust 3610 | Clariant | Polyethylene wax | 128 | 4.5-5.5 | 8.9 | Example according to disclosure (reasonable rub test results - see Examples above) |
| Ceraflour 994 | BYK | Micronized additive based on an amide wax | 145 | 5 | 10 | Poor rub test results - particle shape is too flat. |
| Ceraflour 995 | BYK | Micronized wax on the basis of an amide-PE mixture | 145 | 6 | 11 | Poor rub test results - particle shape irregular - not able to reach substrate in printing |
| Ceridust 9615A | Clariant | wax combination | 140 | 6.5 | 13 | Poor rub test results - irregular shape and particle size distribution is to broad - not able to reach substrate in printing |
| Poly(styrene-co-divinylbenzene) 8 μm | Sigma-Aldrich | Crosslinked polystyrene beads | N/A | 8 | ND | High particle size and tail - bad offline results. |
| Calcium Stearate | Sigam; Ferro | low friction additive | 155 | 2μ (after grind) | 5 | Good offline results, did not show benefit on press - poor rub test results. |
| S-363 | Shamrock | micronized polypropylene alloy | 140 | 4-6 | ≤15* | Poor print quality - high matting observed. |
| S-400-N1 | Shamrock | amide wax powder (Ethylene Bis Stearamide) | 144 | 4-6 | ≤15* | Broad particle size - not able to reach substrate in printing. |
| X-8081 | Shamrock | micronized modified polypropylene wax | 143-148 | 4-6 | ≤9* | Flat, flake-like particle shape (not globular) - |

TABLE 1-continued

| Material name | Supplier | Chemistry | mp (c. °) | D50 (μm) (Median) | D90 (μm) (tail) | Comment |
|---|---|---|---|---|---|---|
| | | | | | | good offline results, did not show benefit on press - poor rub test results. |
| NonSkid 59 | Shamrock | micronized polypropylene | 150 | 7-10 | 20 | Broad particle size - bad offline. |
| TextMatte 6005 | Shamrock | cross-linked polymethyl methacrylate | N/A | 5-8 | ≤20 | Broad particle size - bad offline. |
| Micropro 400 | Micro powders | finely micronized modified polypropylene wax | 150-156 | 7-10 | ≤31 | Broad particle size - not able to reach substrate in printing. |
| Micromatte 2000 | Micro powders | finely micronized hybrid polypropylene wax | 146-149 | 6-9 | ≤22 | Broad particle size - not able to reach substrate in printing. |
| Micromide 520XF | Micro powders | finely micronized EBS(ethylene Bis stearamide) wax vegetable based | 141-145 | 3-5 | 16 | Broad particle size - not able to reach substrate in printing. |
| Micromide 520 | Micro powders | finely micronized EBS(ethylene Bis stearamide) wax vegetable based | 141-145 | 5-7 | 22 | Broad particle size - not able to reach substrate in printing. |
| Micromide 528 | Micro powders | finely micronized EBS(ethylene Bis stearamide) wax vegetable based | 140-145 | 6-8 | 22 | Bad offline results. |
| SUPERGLIDE 904 | Micro powders | modified amide waxes | 138-145 | 4-6 | 22 | Broad particle size - bad offline. |
| SUPERGLIDE 904XF | Micro powders | modified amide waxes | 138-146 | 3-5 | 16 | Broad particle size - bad offline. |
| Superslip 6515 | Micro powders | combination of Ethylene homopolymer and EBS | 124-137 | 6-8 | ≤22 | Bad offline results |
| Superslip 6530 | Micro powders | combination of Ethylene homopolymer and EBS | 124-135 | 6-8 | ≤22 | Broad particle size - not able to reach substrate in printing. |
| Pinnacle 1995 | Lubrizol | Micronized Modified Polypropylene Wax | 140 | ≤6 | ≤14 | Broad particle size - not able to reach substrate in printing. |
| Pinnacle 1996 | Lubrizol | Micronized Polypropylene Wax | 140 | ≤9 | ≤18 | Broad particle size - not able to reach substrate |
| Pinnacle 1998 | Lubrizol | Micronized Amide Modified Synthetic Wax | 140 | ≤9 | ≤22 | Broad particle size - not able to reach substrate in printing. |
| Pinnacle 1350 | Lubrizol | Micronized Polyethylene/Polypropylene | 150 | 9 | ≤22 | Broad particle size - bad offline |
| SIDISHIELD C25 | ELKEM | Amorphous silica (low Iron) | N/A | 0.15 | ND | Material was not able to be dispersed inside ink. |
| Ceraflour 1000 | BYK | Biodegradable Polymer based on Renewable Resources with Wax-like Properties | 175 | 5 | ≤13 | Good offline results, good compatibility in Isopar.did not show benefit on press - poor rub test results. |
| CeraFlour 920 | BYK | Micronized Organic Polymer | 200 | 5 | 13 | Good offline results, good compatibility in Isopar.did not show benefit on press - poor rub test results. |
| CeraFlour 991 | BYK | Micronized polyethylene wax | 115 | 5 | 9 | Good offline results, low melting point. Did not show benefit |

TABLE 1-continued

| Material name | Supplier | Chemistry | mp (c. °) | Particle size (μ) D50 (μm) (Median) | D90 (μm) (tail) | Comment |
|---|---|---|---|---|---|---|
| MPP 611 | Micro powders | finely micronized polyethylene wax | 109-111 | 5-6 | ≤22 | on press - poor rub test results low melting point. Did not show benefit offline |
| MPP 230 | Micro powders | micronized economical polyethylene wax | 113-124 | 7-9 | ≤23 | low melting point. did not show benefit offline |
| Lanco PP 1362 SF | Lubrizol | Micronized Modified Polypropylene Wax, very finely micronized | 140 | ≤6 | ≤14 | Broad particle size - not able to reach substrate in printing. |

The above results illustrate that globular particles comprising a hydrocarbon, particularly HDPE, having a drop point of at least 120° C., and having a D50 of from 2 μm to 7 μm and a D90 of 10 μm or less seemed to be effective replacements for PTFE particles in electrostatic ink compositions (particularly those containing a resin having acidic side groups) in that they gave a similar rub resistance results. They also showed reasonable results in flaking results. Other types of particles tested (not according to the disclosure, i.e. Ceraflour 994 and all particles below this in the table) appeared to be too miscible with the resins or did not form a suitably stable suspension within the Isopar liquid or were not transferred to a print substrate during printing or, even if transferred, gave poor results in a rub resistance test.

While the electrostatic ink composition, the method and related aspects have been described with reference to certain examples, those skilled in the art will appreciate that various modifications, changes, omissions, and substitutions can be made without departing from the spirit of the disclosure. It is intended, therefore, that the compositions, methods and related aspects be limited by the scope of the following claims. The features of any dependent claim can be combined with the features of any of the other dependent claims, and any independent claim.

The invention claimed is:

1. A liquid electrostatic ink composition comprising a liquid carrier having dispersed therein:
   chargeable particles comprising a thermoplastic resin having acidic side groups; and
   globular particles having a carbohydrate core and a shell surrounding the carbohydrate core, the carbohydrate core being a monosaccharide or a polysaccharide of a saccharide unit selected from the group consisting of ribose, arabinose, xylose, lyxose, allose, altrose, glucose, mannose, and galactose, and the shell being a hydrocarbon having a drop point, measured according to ASTM D3954-15, of at least 120° C., the globular particles having a D50 of from 2 μm to 7 μm and a D90 of 10 μm or less, the D50 and D90 being measured in the liquid carrier using laser diffraction and volume distribution, in accordance with ISO13220, wherein the hydrocarbon is polyethylene.

2. The liquid electrostatic ink composition according to claim 1, wherein the polyethylene comprises high density polyethylene.

3. The liquid electrostatic ink composition according to claim 1, wherein the polyethylene has a drop point of at least 125° C.

4. The liquid electrostatic ink composition according to claim 1, wherein at least some of the globular particles have an aspect ratio of 1.5 or less.

5. The liquid electrostatic ink composition according to claim 1, wherein the globular particles are present in an amount of from 3 wt % to 15 wt % of the solids of the liquid electrostatic ink composition.

6. The liquid electrostatic ink composition according to claim 1, wherein the liquid electrostatic ink composition lacks halogenated compounds.

7. The liquid electrostatic ink composition according to claim 1, wherein the thermoplastic resin having acidic side groups is a copolymer of an alkylene monomer and a monomer selected from acrylic acid and methacrylic acid.

8. A method of forming an electrostatic ink composition comprising:
   grinding a thermoplastic resin having acidic side groups in a liquid carrier to provide a slurry comprising particles comprising the thermoplastic resin dispersed in the liquid carrier;
   adding globular particles to the slurry, the globular particles having a carbohydrate core and a shell surrounding the carbohydrate core, the carbohydrate core being a monosaccharide or a polysaccharide of a saccharide unit selected from the group consisting of ribose, arabinose, xylose, lyxose, allose, altrose, glucose, mannose, and galactose, and the shell comprising a hydrocarbon having a drop point, measured according to ASTM D3954-15, of at least 120° C., and the globular particles having a D50 of from 2 μm to 7 μm and a D90 of 10 μm or less, the D50 and D90, when measured in the liquid carrier using laser diffraction and volume distribution, in accordance with ISO13220, wherein the hydrocarbon is polyethylene;
   wherein the globular particles are mixed in the slurry without reducing the particle size of the globular particles.

9. The method according to claim 8, wherein the globular particles are mixed in the slurry by stirring or shaking the slurry.

10. The method according to claim 8, wherein a charge director is added to the slurry either before or after adding the globular particles to the slurry.

11. A substrate having printed thereon:
   a layer formed from a thermoplastic resin having acidic side groups;
   wherein globular particles protrude above the surface of the thermoplastic resin, the globular particles having a carbohydrate core and a shell surrounding the carbohydrate core, the carbohydrate core being a monosaccharide or a polysaccharide of a saccharide unit selected from the group consisting of ribose, arabinose, xylose, lyxose, allose, altrose, glucose, mannose, and galactose, and the shell comprising a hydrocarbon having a drop point, measured according to ASTM D3954-15, of at least 120° C., wherein the hydrocarbon is polyethylene.

12. The substrate according to claim 11, wherein at least some of the globular particles have a diameter of from 2 μm to 10 μm.

* * * * *